United States Patent [19]

Hockin, deceased et al.

[11] 4,356,031

[45] Oct. 26, 1982

[54] APPARATUS AND METHOD FOR CONTROLLING THE RECYCLE CHAR CIRCUIT IN A DIRECT REDUCTION PROCESS

[75] Inventors: Harry W. Hockin, deceased, late of Attadale, Australia, by Jane S. Hockin, executrix; Brian F. Bracanin, Busselton, Australia; Ronald J. Clements, Capel, Australia; Vitie P. Keran, Bunbury, Australia; Alan C. Baker, Harriman, Tenn.

[73] Assignee: The Direct Reduction Corporation, New York, N.Y.

[21] Appl. No.: 244,154

[22] Filed: Mar. 16, 1981

[51] Int. Cl.³ ............................................. C21B 13/08
[52] U.S. Cl. ...................................... 75/36; 266/91; 266/173; 414/148
[58] Field of Search ................... 266/78, 80, 79, 81, 266/91, 99, 173; 414/21, 296, 148; 75/36

[56] References Cited

U.S. PATENT DOCUMENTS 4,170,311 10/1979 Spaw .................................. 414/296
4,304,597 12/1981 Keran et al. ........................... 75/36

FOREIGN PATENT DOCUMENTS 888553 1/1962 United Kingdom ................. 414/21

Primary Examiner—M. J. Andrews
Attorney, Agent, or Firm—Cooper, Dunham, Clark, Griffin & Moran

[57] ABSTRACT

A method and means for maintaining optimum operation of the process for directly reducing iron oxides in a rotary kiln, using a solid carbonaceous reducing agent, such as coal fed at both the charge feed end and discharge end as the source of fuel and reductant, and oxygen-containing gases is disclosed wherein the DRI product, charred coal or char, and fine waste found in the kiln discharge materials from the discharge end are separated and measured for fixed carbon content and the process parameters may be adjusted to optimum by establishing an appropriate percentage by weight, in the range from 5% to 15%, of fixed carbon in the total of these discharge materials. This optimum condition may be monitored by establishing a particular level of char in the char recycle bin once the appropriate percentage by weight of fixed carbon is established in these discharge materials and optimum operation is maintained by maintaining the particular level of the char in the recycle bin and appropriately adjusting the coal feed and related parameters of the process if the char level rises or drops within the bin.

10 Claims, 3 Drawing Figures

APPARATUS AND METHOD FOR CONTROLLING THE RECYCLE CHAR CIRCUIT IN A DIRECT REDUCTION PROCESS

BACKGROUND OF THE INVENTION

The present invention relates to a process for directly reducing iron oxides in a rotary kiln using a solid carbonaceous reducing agent, such as coal, as the source of fuel and reductant, and oxygen-containing gases, and more particularly, to a method and means for detecting optimum operation of the process by measuring the fixed carbon content in the total discharge materials from the discharge end of the kiln and when an appropriate percentage by weight is found, maintaining optimum operation by controlling the recycle char circuit.

Many different methods have been suggested and used for carrying out the direct reduction of ores and other materials containing iron oxides using carbonaceous materials, particularly coal, as the source of both the heating agent and reductant in a rotary kiln. For example, in some of these processes the coal is fed into the kiln through the discharge end by mechanical or pneumatic means, such as respectively disclosed in U.S. Pat. No. 3,113,859 to Moklebust and U.S. Pat. No. 3,505,060 to Heitmann, and in some it is fed at the center of or along the kiln, such as disclosed in U.S. Pat. No. 3,206,299 to Senior et al. However, considerable problems have been encountered with these various approaches, many of which problems have been overcome by the process disclosed in U.S. Pat. No. 3,890,138 to Hockin. In this latter process, a portion of the coal is injected or blown into the discharge end of the kiln, and the remaining portion of the coal is fed with the ore at the charge feed end. The kiln operationally has a reducing zone toward the discharge end and a preheat zone toward the feed end, and the coal is distributed in the kiln in such a manner that the amount of coal injected from the discharge end is sufficient to aid in controlling the temperature profile throughout both zones of the kiln.

Although the process of Hockin was developed particularly for use in reducing ilmenite, it has been found that the dual end coal feeding technique improves upon the other coal feeding methods presently used in reducing iron ores and other materials to directly reduced iron (DRI) or sponge iron in rotary kilns with the direct reduction process, and the present invention relates to improvements in this latter process when dual end coal feeding is used.

It has been the practice in the art when directly reducing iron ores to DRI in a rotary kiln using coal as the reductant, to recover and recycle the charred coal found in the kiln discharge materials. This charred coal or char is separated from the metallized portion of the materials and from the waste solids and is collected in a char recycle bin from which it is fed at a selected rate back to the kiln for reuse in the process. The present invention involves the use of the char recycle circuit to establish, and maintain the process at, optimum operating conditions in an improved and simplified manner.

SUMMARY OF THE INVENTION

The present invention involves monitoring of the amount and feeding of the recycle char found in the materials discharged from a rotary kiln directly reducing ores and other materials containing iron oxides, using a solid carbonaceous material, such as coal, as the source of both the fuel and reductant, along with oxygen-containing gases, in order to maintain the process operating under optimum conditions.

More particularly, it has been determined that it is possible to evaluate when such a direct reduction process is operating at or near optimum conditions by monitoring the fixed carbon content of the total discharge materials from the discharge end of the kiln. Specifically, the fixed carbon content in the total discharge materials should be maintained with the range of approximately 5–15% by weight, the particular percentage depending upon the qualities of the reductant and oxides involved and the operating temperature of the kiln. Thus at process start-up the kiln discharge materials are analyzed and the operating parameters including fixed carbon content are adjusted to their optimum values. The continuing determination and monitoring of the fixed carbon content of the kiln discharge materials then provides an indication of whether or not the operation is continuing at optimum levels.

Of course, continuous analysis of the kiln discharge materials to achieve such monitoring can be a time-consuming and comparatively expensive operation. For example, in determining the fixed carbon percentage in the total discharge materials, the DRI product, the coarse or return char and the fine char, as well as the fine waste must all be measured and the sum of their weights compared with the total weight of the kiln discharge materials.

The present invention further takes advantage of the char recycle circuit (wherein return char when recovered from the discharge materials is fed to a recycle bin from which it is withdrawn at a preselected rate for reintroduction into the kiln process) by monitoring the level of the char in the recycle bin once optimum operation of the process has been established, which level will be proportionally related to the percentage of fixed carbon in the kiln discharge materials. A supply of char is accordingly built up in the bin to an appropriate level upon process start-up, and the particular char level resulting after the adjustment of the operating parameters to their optimum levels is then monitored by operator observation or by instrumentation since any variation in the established level will indicate deviation of the process from the optimum operating conditions.

DETAILED DESCRIPTION OF THE PREFERRED EMBODIMENT

Figure 1:
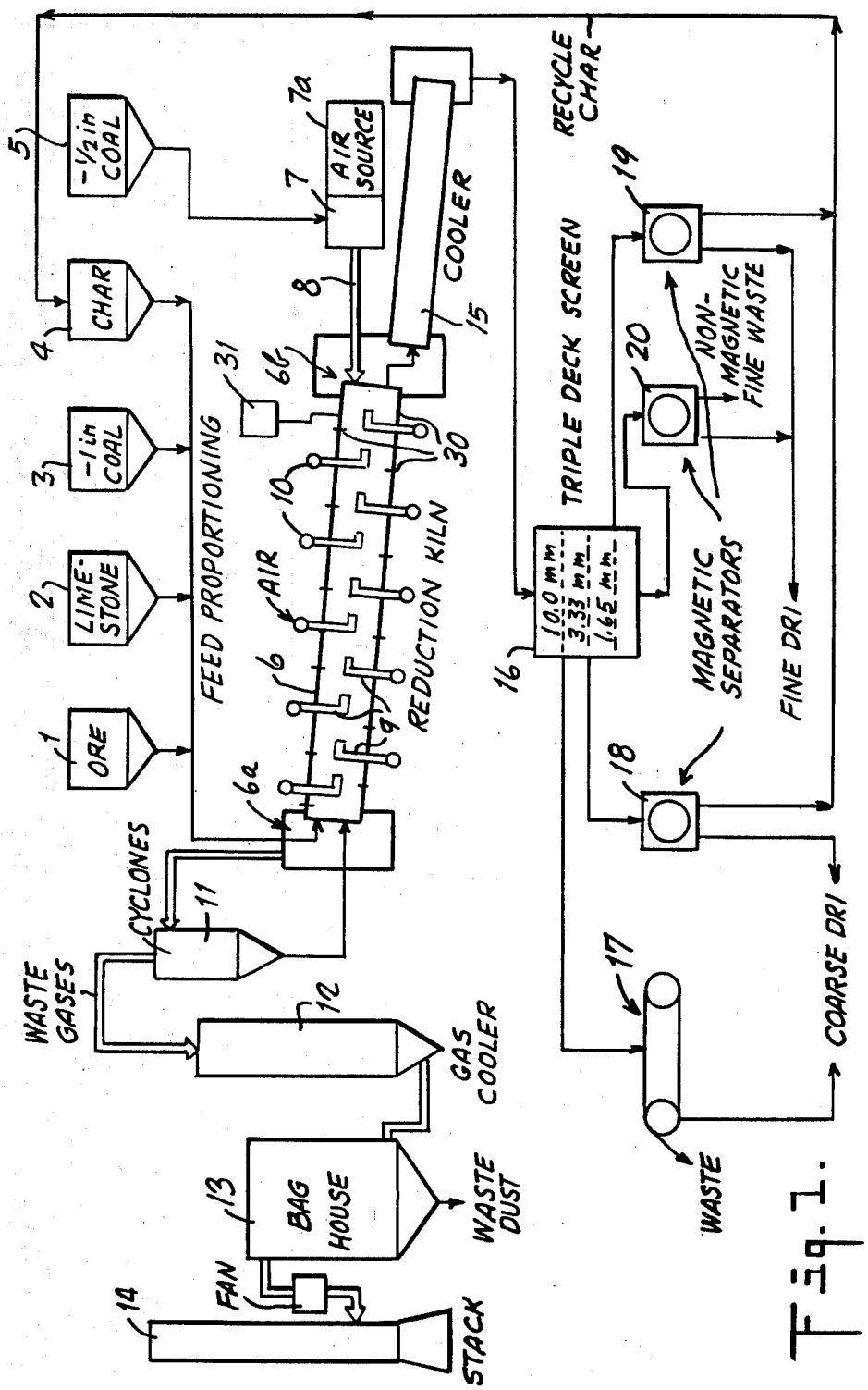
FIG. 1 is a diagrammatic view of a direct reduction plant illustrating the appropriate equipment and steps in carrying out a process for the production of DRI in which plant and process the present invention may be applied.

A flow diagram of a direct reduction plant for the production of DRI or sponge iron, of the type utilizing a rotary kiln, into which a solid carbonaceous material acting as the source of both fuel and reductant is fed at both the charge feed end and the discharge end, and in connection with which the present invention may be practiced, is shown in FIG. 1. The plant comprises an array of feed bins respectively including: a bin 1 for supplying a source of iron oxides, such as ore, typically in the form of iron oxide pellets or natural lump ore; a bin 2 for providing limestone or dolomite for sulfur control; a bin 3 for providing a suitable carbonaceous reducing agent, typically in the form of coal of less than 1 inch nominal diameter particles; and a bin 4 for supplying recycle char. The iron ore, coal, return or recycle char, and dolomite or limestone are accurately proportioned and fed continuously as a charge to the feed end 6a of the reduction kiln 6. A remaining bin 5 supplies coal, typically of less than ½ inch nominal diameter particles to the discharge end 6b of the rotary kiln 6, where carefully controlled quantities are injected or blown in. The latter coal is fed to a fireman device 7 from which it is blown by means of low pressure carrier air from a suitable source 7a, through a coal injection pipe 8 which can be adjusted to achieve the optimum trajectory for this coal. A suitable system for the blowing and adjusting is disclosed in U.S. Pat. No. 4,306,643, assigned to the same assignee as the present application.

The reduction kiln 6 may be typically 11.5 feet (3.5 meters) in outside shell diameter and 148 feet (45 meters) long, sloped at 3%. It may be supported on two tires and driven by a 200 horsepower variable speed D.C. motor and lined with 8 inches of refractory brick or preferably castable refractory.

In addition to the introduction of carrier air through pipe 8, the kiln is equipped with a series of shell-mounted air injection tubes 9 which are spaced along its length and extend into the interior of the kiln for drawing air from the outside and injecting it along the kiln axis to enhance combustion. Each of the tubes 9 is equipped with its own fan and motor combination 10 so that the rate of injection may be properly regulated at spaced positions along the kiln. Also, spaced along the kiln are twelve thermocouples 30 which measure the average temperature of the charge in the kiln and of the gas.

The hot, waste gas or off-gases exhaust from the feed end 6a of the kiln and pass into an off-gas processing or cleaning system. In a suitable cleaning system the gases may be passed first to twin refractory-lined scalping cyclones 11, which remove and recycle coarse dust, and then to a 57 feet high by 11.5 feet inside diameter spray cooling tower 12 where they may be cooled to 260° C. before passing to an 8-cell bag house 13 equipped with glass fiber bags for removing the fine dust. The cleaned gases may exit via an induced draft fan and a 100 feet high stack 14.

The material discharged from the discharge end 6b of reduction kiln 6 by means of a sealed transfer chute consists of a mixture of DRI, coal char, coal ash and desulfurizing agent and other fine waste. This material is cooled in a rotary cooler 15 which is sealed from the ambient atmosphere, fitted with lifters, and cooled externally with water. The cooled mixture is then passed from the cooler 15 to a screening system 16 and screened. The two oversized fractions are subject to magnetic separation in respective magnetic separators 17 and 18, and the remaining fines are magnetically separated in separators 19 and 20. Separators 17 and 18 remove the coarse DRI to the product load out area. The nonmagnetic fractions from the separators 18 and 19 are conveyed to the return char bin 4 and the fine nonmagnetic materials are passed to waste. This separation system then yields coarse and fine DRI or sponge iron, recycle char and fine nonmagnetic waste.

In a plant such as shown in and described in connection with FIG. 1, with proper control of combustion conditions over the kiln bed and reduction conditions in the bed, optimum utilization of kiln volume with metallization consistently over 90% can be achieved.

Regarding the process itself, directly reducing iron oxides in the rotary kiln using solid carbonaceous material derived from coal as the source of heat and reductant involves complex gas/solid reaction mechanisms. Overall reduction kinetics are affected by bed temperature, solids particle size, carbon/iron oxide ratio in the bed, reactivity of the char produced from the coal, the effect of catalysts on char reactivity, and reducibility of the iron oxides. Control of the rate of heat transfer to the bed and control of bed temperature are critical parameters for steady operation of the kiln so that stable process chemistry and kinetics result.

The properties of the coal and char used in the process are fundamental considerations in the design and metallurgical performance of direct reduction kilns. Physical losses of fixed carbon from the process occur in the bag house dust and in the fine char in the nonmagnetic fine waste from the screening and separation systems as well as in the DRI product itself. These losses are largely dependent on the char strength. In addition, to maintain the correct carbon level in the kiln discharge, the char must have sufficient strength to resist complete degradation in passing through the kiln. Degradation of the char in moving along in the kiln may occur to such an extent that the total coal feed rate must be increased to compensate for fine char losses and thus a relatively high fixed carbon consumption per unit weight of iron fed may result.

While all of the factors entering into the proper operation of the process are quite complex, the present invention involves a simple technique for monitoring continuing proper operation by controlling the char recycle circuit and merely establishing and observing the level of char in the recycle char bin after first establishing an appropriate percentage by weight of the fixed carbon in the total discharge materials from the discharge end of the kiln.

More particularly, for optimum operation of the direct reduction process in accordance with the present invention, it has been determined that the fixed carbon content of the total materials being discharged from the discharge end of the kiln should be maintained within the range from about 5% to 15% by weight, the particular percentage depending upon the nature of the oxides and reductant used and/or the maximum operating temperature of the kiln. As the fixed carbon in charred reductants is more reactive at higher temperatures, it follows that at the maximum permissible temperature of the charge materials in the kiln bed, that is, the highest non-sintering temperature, a minimum proportion of fixed carbon may theoretically be permitted in the bed and accordingly, in the total discharge materials from the kiln. Conversely, at lower temperatures this proportion should be higher.

In evaluating the actual fixed carbon percentage, the fixed carbon content of each of the coarse and fine return char, the fine waste, and the DRI product should be determined. Typically it has been found that the appropriate fixed carbon percentage will be about 10% by weight when the maximum operating temperature of the charge materials in the kiln bed is at 1060° C., but, as noted, lower values are permissible at higher temperatures subject to sintering limitations. Thus, once the appropriate fixed carbon percentage by weight in the kiln discharge materials has been determined and established by adjusting the process, optimum operation of the process may be maintained, by monitoring and maintaining that percentage level in the kiln discharge materials. A method and means for establishing the desired percentage level and then continuously monitoring and regulating the process to maintain optimum operation may be implemented as follows.

Firstly, during normal continuous operation of the process, appropriate feed rates are established for the various constituents commensurate with optimum operating conditions. Accordingly, as seen in FIG. 1, the oxide containing materials, such as ore, are fed at a selected rate to the feed end 6a of the kiln 6 and the carbonaceous reductant, typically coal, is fed through both the feed and discharge ends 6a and 6b, at rates dependent upon the ore feed rate and the properties of the ore and coal being used. For example, the ratio of the weight of coal being fed to the kiln per weight of ore will be varied between about 0.5 and 1.2 depending upon the percentage of fixed carbon ($C_{fix}$) in the coal used in the process. More particularly, appropriate relationships in this regard for proper operation of the process have been found to be as follows:

| $C_{fix}$ in coal (natural basis as fed to kiln) | Coal/Ore (by weight fed to the kiln) |
| --- | --- |
| 35% | 1.0 |
| 45% | 0.87 |
| 55% | 0.75 |
| 65% | 0.66 |
| 75% | 0.60 |
| 85% | 0.55 |

The resulting char, containing the major portion of the fixed carbon in the kiln discharge materials, is recovered therefrom by screening and separating units 16 and 18–20, respectively, and recycled by passage to a recycling bin 4 from which it is fed back to the feed end 6a of the kiln at a rate generally based on the rate of the ore feed.

In measuring the fixed carbon content in the total discharge materials from the discharge end of the kiln, it should be appreciated that the composition and tonnage of the kiln discharge materials will vary somewhat during the short term, and although the variations may be slight, they can still be significant, so that accurate sampling and analysis normally requires techniques which will provide data averaged over a period from 12 to 24 hours. A preferred technique developed in accordance with the present invention involves the following measuring steps.

Figure 2:
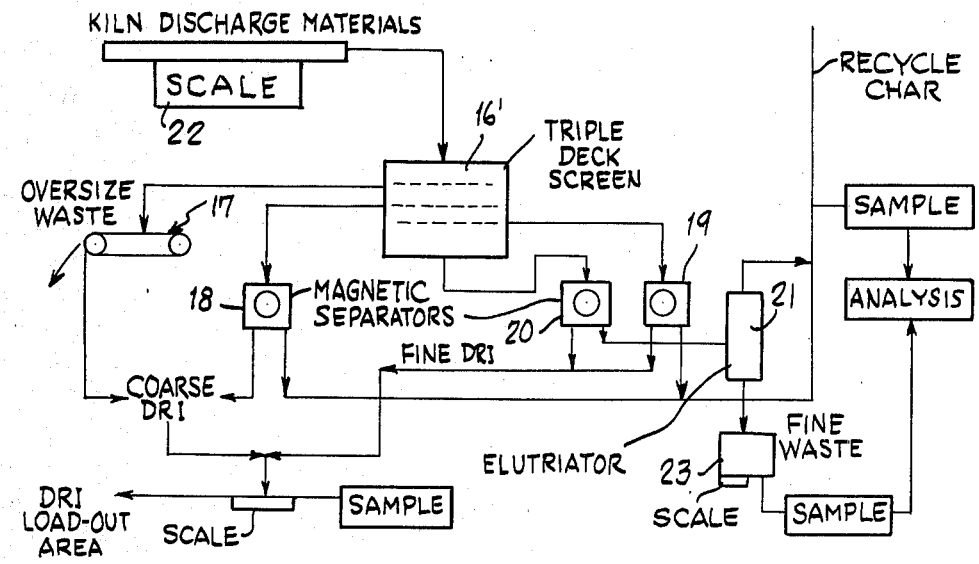
FIG. 2 is a diagrammatic view of the kiln discharge materials handling system of the plant of FIG. 1 modified in keeping with the present invention.

Firstly, as seen more particularly in FIG. 2, the total discharge materials from the discharge end of the kiln are weighed by a suitable scale 22 on the way to the separation section so that a continuous record may be kept of the tonnage of the kiln discharge solids.

Upon reaching the separation section all of the materials are screened in a suitable screening system 16' which may be identical to system 16 in FIG. 1 or have screens of different sizes if appropriate. The coarse and oversized pieces are initially screened and carried to magnetic separator 17 that separates the coarse DRI from the coarse waste, which contains little fixed carbon, and these materials are then respectively conveyed to their appropriate load-out areas. The material particles of the next size, such as greater than No. 10 Tyler mesh, are screened out and carried to magnetic separator 18 from which the separated DRI is passed to the load-out area and the nonmagnetic particles, which by virtue of their size are primarily char, are conveyed off to the char bin 4 for recycling. The next smaller sized particles are screened out by the appropriate mesh screen and magnetically separated in separator 19. The separated fine DRI is carried to the load-out area, and the fine char is passed to the recycle char conveyor for delivery to bin 4. The remaining fine particles are similarly magnetically separated in separator 20, and an air elutriation device 21 may be disposed in the system before or following separator 20 to remove further fine char for recycling from the magnetic waste. Accordingly, the fine DRI from separator 20 is passed to the load-out area, and the removed fine char is passed to the recycle char conveyor for recycling via bin 4. The remaining fine nonmagnetic material separated in the separator-elutriation device combination may then be passed to a further magnetic separator or may merely be discarded as fine waste.

All of the collected char, both comparatively coarse and fine, that is recovered in the separation system is conveyed to the char bin 4 which normally is adapted to hold about a 24-hour supply of char. The bulk density of the char carried to the bin 4 will be known and changes in the level of the char in the bin may be readily and easily determined, such as by recording thrice hourly with suitable bin level monitoring instrumentation, so that tonnage changes in the char fed to the bin and also of the char within the bin are readily measured.

The fine nonmagnetic waste which primarily comprises used limestone, fine char and ash, refractory bits and other particles, is passed to a trailer 23, which may have about a 12-hour capacity, and each trailer load is accurately weighed.

The DRI product is weighed daily, and a daily composite sample is taken.

Samples of the char fed to the bin 4 and of the fine nonmagnetic waste fed to the trailer 23 are taken hourly and composited daily. The three daily composite samples are analyzed to determine the percentage of fixed carbon in each using standard ASTM methods.

To determine the fixed carbon content, by weight, of the total discharge materials from the collected data for a given time period such as 24 hours, the number of tons of fixed carbon in the recycle char, in the nonmagnetic waste, and in the DRI product are calculated so that the total fixed carbon tonnage from the kiln, which is the sum of these three values, may be found for the selected period. The total tonnage of the kiln discharge solids is continuously determined by weighing these materials in the line of flow, and when divided into the above-determined fixed carbon tonnage provides an indication of the percent of fixed carbon by weight in the total kiln discharge materials during the period. This percentage indication may then be used to establish and maintain optimum operating conditions for the process based on the disclosed appropriate percentages.

However, while the just-described technique is particularly appropriate in establishing the optimum fixed carbon percentage, it is time-consuming and insufficiently responsive as a continuing procedure for monitoring and maintaining the optimum process operating condition. A further feature of the present invention deals with this problem by providing a simple and readily responsive technique for monitoring and maintaining the process operations at optimum. In this regard it has been appreciated that since the tonnage of carbon passing to fine waste will be dependent on the coal and char strength, this tonnage may be assumed to be constant in a given process. Similarly, the carbon content of the DRI will vary insignificantly. Consequently, variations in the fixed carbon will be reflected in the recycle char circuit. Thus, the percentage of fixed carbon in the kiln discharge materials can be set and maintained by establishing and monitoring a particular char level in the recycle char bin 4.

It will therefore be seen that by controlling the char recycle circuit and merely establishing and observing a selected level of char in the recovery bin 4 it is possible to regulate the present direct reduction process and maintain it operating under optimum conditions. The preferred procedure for accomplishing this from process start-up involves the steps as follows:

1. To start the process, the ore and the feed end coal and discharge end coal are initially fed to the kiln 6 at respective rates and proportions estimated generally in accordance with the nature of the ore and coal being used, as described above.

2. The feed rate of the feed end coal is set higher than that normally estimated to be commensurate with optimum operating conditions in order to initially produce a good supply of char in the materials discharged from the discharge end 6b of the kiln.

3. The majority of the resulting char is recovered from the kiln discharge materials as previously described and is accordingly conveyed to the recycling bin 4.

4. The rate of feeding of the char from the bin 4 back to the feed end 6a of the kiln 6 is set at about the normal estimated rate for withdrawing char from the bin 4 under optimum operating conditions and is generally based on the rate of ore feed.

5. Due to the excess of char being initially produced, the level of char in the bin 4 will rise since the amount of char being conveyed to the bin will be greater than that withdrawn from the bin.

6. Analysis of the initially produced kiln discharge materials is carried out generally in the manner described above to determine the percentage of fixed carbon therein and whether the proper metallization is being achieved. The desired fixed carbon percentage will normally be in the rage between 5% and 15% by weight depending particularly, as previously indicated, on the type of ore and coal used and the operating temperatures in the kiln. Typically the desired percentage of fixed carbon by weight in the total materials discharged from the kiln will be about 10% when the maximum operating temperature of the charge materials in the kiln bed is at about 1060° C., but lower values are permissible at higher temperatures, which temperatures, however, are limited by sintering in the kiln charge.

7. To bring the fixed carbon content of the total discharge materials to the desired percentage and thus establish optimum operation, the feed rate of the feed end coal is adjusted along with the char feed rate until the desired percentage is achieved, at which point a certain level of char in the bin 4 will be established.

8. Once the process is running satisfactorily on a continuous basis such that the fixed carbon content of the total discharge materials from the kiln discharge end has been stabilized at the appropriate operating percentage, no further analysis or measurements of the kiln discharge materials need be made on a continuing basis for maintaining optimum operation, since any variation in balanced operation, such as a change in the moisture content of the feed end coal, will be readily evidenced by a change in the level of the char in the recycling bin 4.

9. Accordingly, if the amount of char in the bin begins to increase such that the char level is caused to rise, the feed rate of the feed end coal may be reduced to return the char level to the established level, and correspondingly, should the char level drop, the feed end coal may be increased to restore the char to the established level. Adjustment of the feed rate of the feed end coal is preferred for controlling the char level since adjustment of the discharge end coal is preferably used for establishing the temperature profiles within the kiln, and the feed rate of the discharge end coal is generally held constant to stabilize kiln temperatures.

Figure 3:
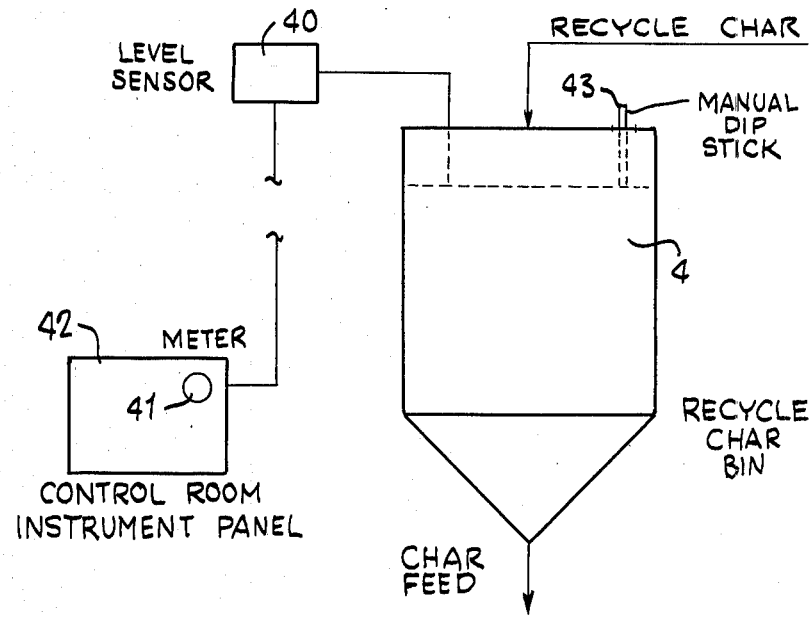
FIG. 3 is a diagrammatic view of the char recycling bin of the plant in FIG. 1 illustrating char level monitoring in accordance with the present invention.

Monitoring of the char level in the bin 4 may be carried out in many convenient ways. The bin level may be directly viewed by a plant operator, or indirectly observed, such as by watching a mechanical probe and indicator which is caused to rise and fall with the level of the char. Preferably the monitoring is accomplished with an automatic instrument system supplemented with periodic checking by means of a manual probe such as a dip stick. More particularly, FIG. 3 shows the char recycling bin 4 equipped with an automatic bin level sensor 40, which preferably is of a suitable conventional type that provides an indicative signal to a meter 41 on the plant control instrument panel 42 to permit an operator to monitor the level of the char in the bin 4 at any moment and initiate control measures. Any deviations from the preselected level indicated on the meter 41 can be adjusted by adjusting the other of the process parameters as mentioned. Since bin level sensing probes may become contaminated, it is advisable that a manually inserted dip stick be used periodically to check the accuracy of the meter reading.

Thus by utilizing the fact that there is a particular percentage by weight of fixed carbon in the total discharge materials from the direct reduction process at optimum operating conditions, as described above, an operator by the simple expedient of observing the level of the char in the recycling bin, either visually or automatically, can control and maintain operation of the process at optimum conditions under ordinary circumstances without the need for any special or extensive measurements of the kiln discharge product.

We claim:

1. A method for controlling the process for the direct reduction of ore or other materials containing iron oxides using a solid carbonaceous reducing agent and oxygen-containing gas in a rotary kiln wherein part of the reducing agent is added from the discharge end of the kiln and the remainder of the reducing agent is added at the feed end, and the discharge materials include DRI, charred reducing agent suitable for reuse in said process, and fine waste, comprising the steps of:
    (a) estimating, for the particular reducing agent, iron oxides and operating temperatures to be used in said process, the appropriate percentage of fixed carbon by weight to be contained in all the materials to be discharged from the discharge end of the kiln, and starting up the process using operating parameters in accordance therewith;
    (b) weighing all of said kiln discharge materials;

(c) separating said charred reducing agent and fine waste from said DRI produced and from each other;

(d) determining the weight of fixed carbon in said DRI produced, charred reducing agent, and fine waste;

(e) determining the percentage of the fixed carbon by weight in the total discharge materials from the discharge end of the kiln to determine whether it is in the range of said estimated appropriate percentage;

(f) adjusting the process operating parameters to establish an actual percentage corresponding to optimum process operation;

(g) transporting said separated charred reducing agent to a bin from which it is fed at a preselected rate back to the kiln;

(h) establishing a level of charred reducing agent in said bin at which optimum process operation is achieved; and (i) maintaining said charred reducing agent at said level in said bin to maintain the process at optimum operation.

2. The method of claim 1 wherein the process parameters are adjusted by adjusting the amount of reducing agent added to the feed end of the kiln.

3. The method of claim 1 wherein the process parameters are adjusted such that the fixed carbon percentage by weight in the kiln discharge materials is about 10% of the total weight of the kiln discharge materials when the maximum operating temperature of the charge materials in the kiln bed is about 1060° C.

4. In the process for reducing ore or other materials containing iron oxides using a solid carbonaceous reducing agent and oxygen-containing gas in a rotary kiln wherein part of the reducing agent is added from the discharge end of the kiln and the remainder of the reducing agent is added from the feed end and wherein the charred reducing agent is recovered from the materials discharged from the kiln discharge end and fed to a recycling bin for return to the process, the improvement wherein a level of charred reducing agent is established in the recycling bin for optimum operating conditions of the process based upon the occurrence of a percentage of fixed carbon in said kiln discharge materials by weight of the total weight of the kiln discharge materials, and this level is monitored for variation to determine variations in process conditions for optimum.

5. In the process of claim 4 wherein said level is established based upon a fixed carbon content of about 10% by weight of the total discharge materials when the maximum operating temperature of the charge materials in the kiln bed is about 1060° C.

6. In the process of claim 4 wherein process control is achieved by inversely varying the amount of reducing agent fed to the kiln with respect to variations of charred reductant level in the recycle bin.

7. In the process of claim 6 wherein the amount of reducing agent fed to the kiln is varied by varying the amount of reducing agent added to the kiln at the feed end.

8. In a system for directly reducing materials containing iron oxides comprising:

a rotary kiln in which the iron oxides-containing materials are reduced;

means for adding a solid carbonaceous reducing agent to the kiln from both the charge feed and discharge ends;

recycling bin means for storing charred reducing agent and returning it to the kiln; and recycling means for recovering the charred reducing agent from the materials discharged from the discharge end of the kiln and feeding it to the recycling bin means for return to the kiln;

the improvement comprising:

means for determining the fixed carbon content by weight in the total discharge materials from the discharge end of the kiln;

means for adjusting the process parameters to establish a particular percentage of fixed carbon by weight in said kiln discharge materials corresponding to optimum process operation;

means for establishing a level of charred reducing agent in the recycling bin means corresponding to optimum operating conditions of the process in the kiln; and means for monitoring said level of charred reducing agent for variations to determine variations in process conditions from optimum.

9. The system of claim 8 wherein said adjusting means comprises means for controlling the adding of said reducing agent at the charge feed end of the kiln.

10. The system of claim 9 wherein said controlling means inversely varies the amount of reducing agent fed to the kiln with respect to the level of charred reducing agent in the recycling bin means.

* * * * *